United States Patent
Fister et al.

(10) Patent No.: US 9,972,820 B2
(45) Date of Patent: May 15, 2018

(54) BATTERY SYSTEM AND METHOD OF PRODUCING A BATTERY SYSTEM

(71) Applicant: SAMSUNG SDI CO., LTD., Yongin-si, Gyeonggi-do (KR)

(72) Inventors: Kevin Fister, Graz (AT); Thomas Kropsch, Leoben (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 690 days.

(21) Appl. No.: 14/105,023

(22) Filed: Dec. 12, 2013

(65) Prior Publication Data

US 2014/0162100 A1 Jun. 12, 2014

(30) Foreign Application Priority Data

Dec. 12, 2012 (EP) .................... 12196778

(51) Int. Cl.
*H01M 2/20* (2006.01)
*H01M 2/10* (2006.01)
*H01M 2/22* (2006.01)
*H01M 10/48* (2006.01)

(52) U.S. Cl.
CPC ......... *H01M 2/202* (2013.01); *H01M 2/1077* (2013.01); *H01M 2/206* (2013.01); *H01M 2/22* (2013.01); *H01M 10/482* (2013.01); *Y10T 29/49117* (2015.01)

(58) Field of Classification Search
CPC .... H01M 2/1077; H01M 2/206; H01M 2/202; H01M 2/22; H01M 2/06; H01M 2/04; H01M 10/482; Y10T 29/49117
See application file for complete search history.

(56) References Cited

U.S. PATENT DOCUMENTS

| | | |
|---|---|---|
| 2002/0022178 A1 | 2/2002 | Asaka |
| 2003/0152826 A1 | 8/2003 | Matsuzawa |
| 2005/0110458 A1 | 5/2005 | Seman, Jr. |
| 2006/0145657 A1 | 7/2006 | Hashida et al. |
| 2010/0081048 A1* | 4/2010 | Nansaka ............. H01M 2/06 429/158 |
| 2011/0097620 A1 | 4/2011 | Kim |
| 2011/0104556 A1* | 5/2011 | Kim .............. H01M 2/1077 429/160 |
| 2013/0309553 A1* | 11/2013 | Kinoshita ........ H01M 2/1077 429/158 |
| 2014/0072853 A1* | 3/2014 | Won ................ H01M 2/204 429/99 |

FOREIGN PATENT DOCUMENTS

| | | |
|---|---|---|
| DE | 198 47 190 A1 | 6/1999 |
| DE | 10 2009 041738 A1 | 2/2011 |
| DE | 10 2010 035 114 A1 | 4/2011 |
| WO | 2010/071292 A1 | 6/2010 |
| WO | WO2012/102373 * | 8/2012 |

* cited by examiner

*Primary Examiner* — Stephen J Yanchuk
(74) *Attorney, Agent, or Firm* — Lewis Roca Rothgerber Christie LLP

(57) ABSTRACT

A battery system and a method for producing a battery system. The battery system has a plurality of battery cells, a covering plate provided on and/or over the battery cells to cover the battery cells, and cell connectors configured to electrically connect battery cells. The cell connectors are arranged in receiving regions of the covering plate.

16 Claims, 5 Drawing Sheets

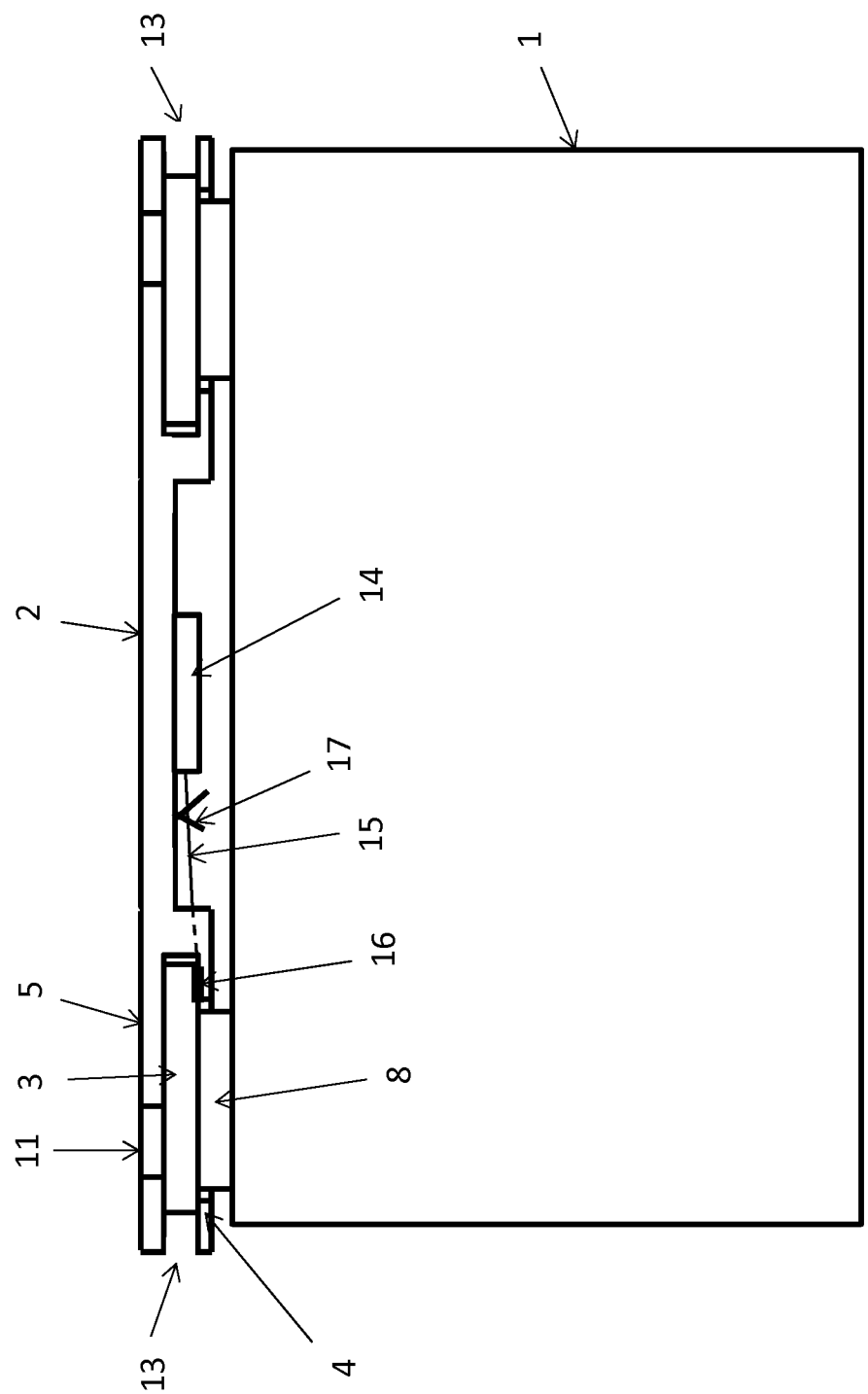

BATTERY SYSTEM AND METHOD OF PRODUCING A BATTERY SYSTEM

CROSS-REFERENCE TO RELATED APPLICATIONS

The present application claims priority 35 U.S.C. § 119 to European Patent Publication No. EP 12196778.0 (filed on Dec. 12, 2012), which is hereby incorporated by reference in its entirety.

TECHNICAL FIELD

Embodiments relate to a battery system and a method for producing a battery system. The battery system has a plurality of battery cells, a covering plate provided on and/or over the battery cells to cover the battery cells, and cell connectors configured to electrically connect battery cells. The cell connectors are arranged in receiving regions of the covering plate.

BACKGROUND

Cell connectors may be installed for connecting, by way of example, in a parallel or series manner, battery cells of a battery system having a plurality cells, in other words, of high voltage batteries. The cell connectors must be connected in an electrically conductive manner to suitable connection points, typically the cell poles, of in each case at least two battery cells. The cell connectors are mainly screwed to the cell poles.

German Patent Publication No. DE 19847190 A1 discloses an injection moulded plate having conductor rails cast therein for connecting several batteries. The conductor rails in each case represent a connection to two batteries. The conductor rails are connected to electrodes of the batteries by way of screws.

German Patent Publication No. DE 10 2010 035 114 A1 discloses a battery unit, having adjacent cell units, wherein each cell unit comprises several accumulator cells and wherein electrodes of the cell units are connected by way of bus-bars. Bus-bar equipping spaces are embodied on an upper housing part and said bus-bar equipping spaces comprise openings for cathode connectors and anode connectors. Bus-bars are provided in the bus-bar equipping spaces and are connected to the electrode connectors of the cells, in particular are welded thereto.

Screw connections are encumbered with disadvantages. For instance, the loading force of the screw connections may thus decrease in the course of time which leads to an increased transfer resistance between cells and cell connectors and consequently to increased resistance and increased temperature. The exterior dimensions of the battery system also increase as a result of using screws having a screw head. Furthermore, the production of a battery system of this type is problematic since the screw heads must be easily accessible for a screwing tool.

Solutions using non-screwed cell connectors cannot be efficiently produced in mass production and/or they cannot generally be produced in a process reliable manner. It is thus difficult by way of example to handle several cell connectors that are only placed on a covering plate.

SUMMARY

In accordance with embodiments, a battery system and a method for producing a battery system is provided and which is simple and reliable to produce whilst having compact dimensions.

In accordance with embodiments, a battery system may include at least one of: a plurality of battery cells; a covering plate provided on and/or over the battery cells to cover the battery cells, and cell connectors configured to electrically connect battery cells and which are arranged in receiving regions of the covering plate, wherein the receiving regions have a first holding surface as a first planar section of the covering plate, and which is on a first face of the covering plate that faces the battery cells, and a second holding surface as a second planar section that is on the second face of the covering plate, and which is remote from the battery cells, and wherein the cell connectors in each case are held between the first holding surface and the second holding surface.

Embodiments relate to a method for producing such a battery system that includes at least one of: inserting the cell connectors between the first and second holding surfaces of the covering plate; placing the holding plate on the battery cells after inserting the cell connectors; and connecting the cell connectors by, for example, a welded process, to the poles of the battery cells.

Embodiments relate to a method for producing such a battery system that includes at least one of: inserting cell connectors between first and second holding surfaces of a covering plate; arranging the covering plate over a plurality of battery cells; and establishing an electrical connection between the cell connectors and poles of the battery cells, wherein: the covering plate includes receiving regions each having the first holding surface at a face of the covering plate that is adjacent to the battery cells, and the second holding surface at a lower face of the covering plate that is remote from the battery cells; and the cell connectors respectively extend through the receiving regions and are respectively held between the first holding surface and the second holding surface.

In accordance with embodiments, the covering plate may have receiving spaces that are delimited by holding surfaces both towards the battery cells as well as in the opposing direction typically towards the exterior of the battery system. In this way, the cell connectors may be arranged in the receiving regions of the covering plate and may be secured in their position by way of the holding surfaces. The term "holding surface" in accordance with embodiments refers to a planar, but three dimensional section of the covering plate, not just the two dimensional surface of the corresponding section. Embodiments having holding surfaces renders it possible to fit a covering plate in accordance with embodiments at an earlier stage prior to the assembly on battery cells using cell connectors. The cell connectors are also held in position without additional positioning devices during the production of the battery system. The correct position of the cell connectors and possible lines that are connected thereto may be tested by way of example prior to assembling the covering plate on the battery cells and may be corrected if necessary.

The holding surfaces must cover a sufficiently large surface of the respective receiving region in order to achieve a secure holding of the cell connectors and in order to prevent the cell connectors falling out by way of example during rotation of the covering plate. It is preferred, therefore, that each holding surface covers one of: greater than 3%, 5%, 10%, 20% or 30% of the surface of its receiving region.

In accordance with embodiments, the first holding surfaces may be formed in each case by way of a first extension and a second extension that lies opposite the first extension, so that the cell connectors on the first face of the covering plate that faces the battery cells are connected to the battery cells on edges of the cell connectors by the first and second extensions and said cell connectors may be electrically connected in the centre of the cell connectors to poles of the battery cells. By virtue of the fact that the laterally lying extensions form the first holding surface that faces the battery cells, it is possible by way of example to weld the cell connectors to the poles of the battery cells centrally. The word "laterally" in the framework of this application is always understood as relating to the narrow sides of the covering plate, in other words, on sides that lie perpendicular to the first face that faces the battery cells and the second face of the covering plate that is remote from the battery cells.

In accordance with embodiments, the first extensions may be shorter in size than the second extensions. Accordingly, the extensions may not have an identical length. As a consequence, it is possible to install and remove a cell connector on sides of the shorter extensions in a simpler manner and to improve the manner in which the cell connector is held by way of the longer extension.

In accordance with embodiments, the receiving regions may be arranged in at least two rows immediately adjacent to one another. This construction is advantageous for a typical sequence of in particular similar battery cells whose positive and negative poles come to lie behind one another, in other words forming rows.

In accordance with embodiments, the first and second extensions may be arranged in a first row of receiving regions in a manner that is symmetrical, i.e., mirrors, the first and second extensions in a second row of receiving regions that is adjacent to the first row. The mirror symmetry relates to a plane perpendicular to a straight connecting line between a receiving region of the first row and a receiving region of the second row. By way of example, the left-hand extension of a row of receiving regions that lies on the left-hand side in the battery system may be shorter than the extension of the same receiving regions that lies on the right-hand side and the left-hand side extension of a row of receiving regions that lies on the right-hand side in the battery system may be longer than the extension of the same receiving regions that lies on the right-hand side. As a consequence, it is possible to install and remove cell connectors in the covering plate, in each case by way of the side of the shorter extension in a relatively effortless manner as long as the covering plate is not connected to the battery cells. As soon as, by way of example, the cell connectors are connected to the poles of the battery cells, neither the cell connectors may be removed from the covering plate nor may the covering plate be detached from the battery cells in a non-destructive manner, since it is not possible to detach the covering plate by way of the short extensions of the first holding surface as a result of the geometric shape.

In accordance with embodiments, the second holding surfaces may include in each case an assembly opening, so that the cell connectors are accessible from the exterior through the assembly openings. A cell connector may in particular be welded to a cell pole by virtue of this assembly opening.

In accordance with embodiments, the second holding surfaces in each case may be folded away by way of a hinge. As a consequence, in the case of a second holding surface that is folded away it is particularly simple to insert a cell connector into the receiving region. A clip contact may be provided, by way of example, to close a second holding surface that is folded together.

In accordance with embodiments, at least one insertion opening may be provided on and/or over a front face of the covering plate for laterally inserting at least one cell connector. As a consequence, as an alternative or in addition to further possibilities for inserting cell connectors it is possible to insert cell connectors laterally into the receiving regions of the holding plate.

In accordance with embodiments, at least one insertion opening for inserting a cell connector may be arranged perpendicular to one of the rows of receiving regions and/or that at least one insertion opening for inserting a cell connector is arranged in the direction of a row of receiving regions. In other words, the cell connectors may be inserted, by way of example, in the direction of the rows of receiving regions so that a whole row of cell connectors preferably including electrically non-conductive separating elements may be pushed collectively into the receiving regions. Alternatively or in addition to, cell connectors may also be pushed in perpendicular to a row of receiving regions. Separating elements, such as the covering plate, may be provided at an earlier stage between the receiving regions.

In accordance with embodiments, a battery system may also include a voltage tapping unit having measuring lines, wherein the measuring lines are connected to the cell connectors in a detachable manner, in particular, by way of clamp connections.

In accordance with embodiments, the ends of the measuring lines may include contact surfaces and the contact surfaces are clamped in each case between a holding surface and the cell connector. Measuring lines of a unit for tapping voltages, by way of example, of a cell monitoring unit may be pre-positioned in this manner on the battery cells in the respectively allocated receiving region at an earlier stage prior to the assembly of the covering plate. For this purpose, one of the holding surfaces, preferably the first holding surface, is used in order to clamp in a contact surface of the measuring line.

In accordance with embodiments, a battery system may include a voltage tapping unit having measuring lines, the measuring lines being fixed to the covering plate in a detachable manner, in particular, by way of holding elements that include the covering plate. As a consequence, the measuring lines by way of example are secured by way of holding elements on the covering plate in addition to the contact surfaces being clamped in the receiving regions.

In accordance with embodiments, the cell connectors may be inserted between the first and second holding surfaces of the covering plate for the purpose of producing a battery system in accordance with embodiments, subsequently the covering plate is placed on and/or over the battery cells and subsequently the cell connectors are welded to the poles of the battery cells.

In accordance with embodiments, measuring lines, if present, may be secured to the covering plate prior to inserting the cell connectors. The covering plate that is already pre-equipped with measuring lines and cell connectors is placed on to the battery cells and subsequently the cell connectors are welded to the poles of the battery cells.

DRAWINGS

Embodiments will be illustrated by way of example in the drawings and explained in the description below:

FIG. 5 illustrates a front schematic illustration of a battery system in accordance with embodiments.

DESCRIPTION

Figure 1:
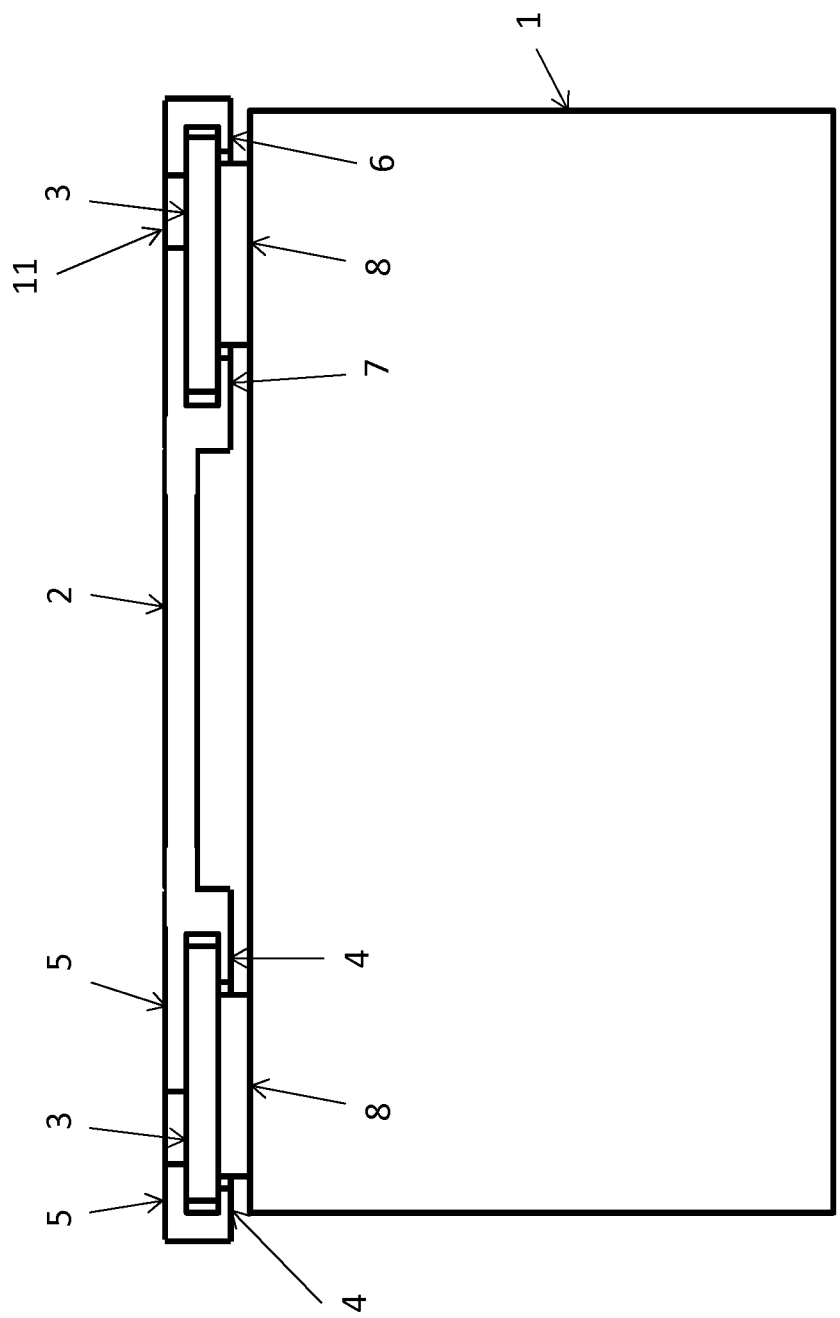
FIG. 1 illustrates a front schematic illustration of a battery system in accordance with embodiments.

FIG. 1 illustrates a battery system in accordance with embodiments, and which may include a plurality of battery cells 1. A covering plate 2 is provided on and/over the battery cells 1 to cover the battery cells 1. The covering plate having a plurality of cell connectors 3 that are in electrical communication with poles 8 of the battery cells 1, and are mechanically connected thereto, for example, by a weld to establish such electrical communication. The cell connectors 3 may be arranged in open receiving regions of the covering plate 2 that are delimited in each case by a first holding surface 4 on the first face of the covering plate 2 that faces the battery cells 1, and by a second holding surface 5 on the second face of the covering plate 2 that is remote from the battery cells 1. The cell connectors 3 are held in each case between the first holding surface 4 and the second holding surface 5. The first holding surface 4 is formed by way of two lateral extensions 6, 7 of which the first extension 6 is shorter than the second extension 7 on the opposite lying side of the receiving region.

Corresponding receiving regions are illustrated in FIG. 1 by way of a first pole 8 arranged on the left hand-side and a second pole 8 arranged on the right hand-side, wherein for the sake of clarity, the corresponding reference numerals are disclosed in each case only on one side of the illustration. The extensions 6, 7 of the first holding surface 4 that is allocated to a left-hand row of receiving regions are arranged in a manner that mirrors, i.e., is symmetrical, the extensions 6, 7 of a first holding surface 4 that is allocated to a right-hand row of receiving regions so that the shorter first extension 6 is located in the left-hand row to the left of the respective pole 8 and in the right-hand row to the right of the respective pole 8. The second holding surfaces 5 may have assembly openings 11, by way of which it is possible, by way of example, to establish an electrical connection of the cell connectors 3 to the poles 8 using a welding device.

Figure 2:
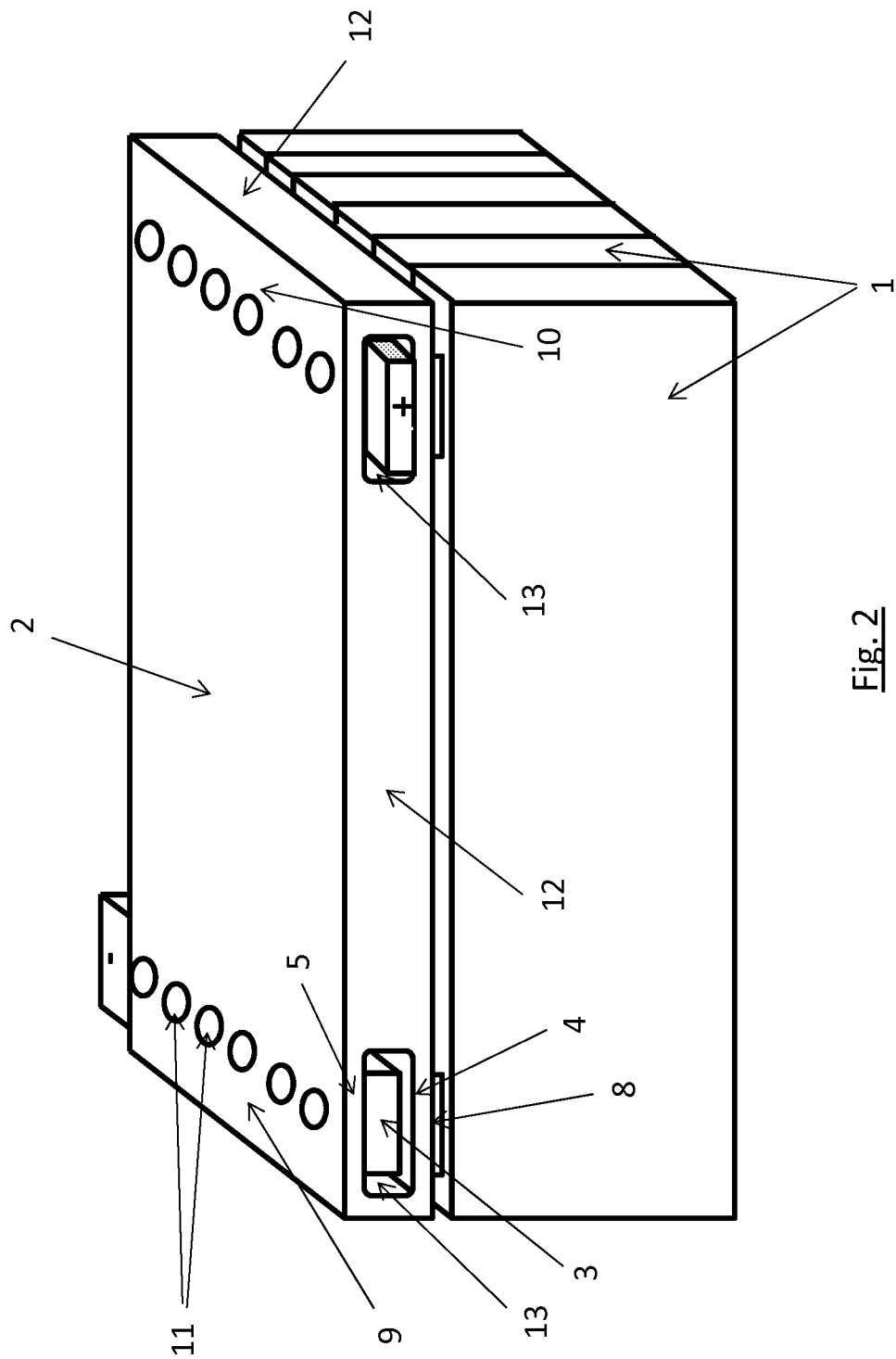
FIG. 2 illustrates a three-dimensional schematic illustration of a battery system in accordance with embodiments.

FIG. 2 illustrates how the receiving regions that are allocated to a pole 8 that is illustrated in each case on the left-hand side form a first row 9 and the receiving regions that are allocated to a pole 8 that is illustrated in each case on the right-hand side form a second row 10. The covering plate 2 has insertion openings 13 on one of the end sides 12. Cell connectors 3 may be inserted, by way of example, in each case alternating with non-electric separating elements in the direction of the first and second rows 9, 10 of receiving regions and are held in their position by the first holding surfaces 4 and second holding surfaces 5.

Figure 3:
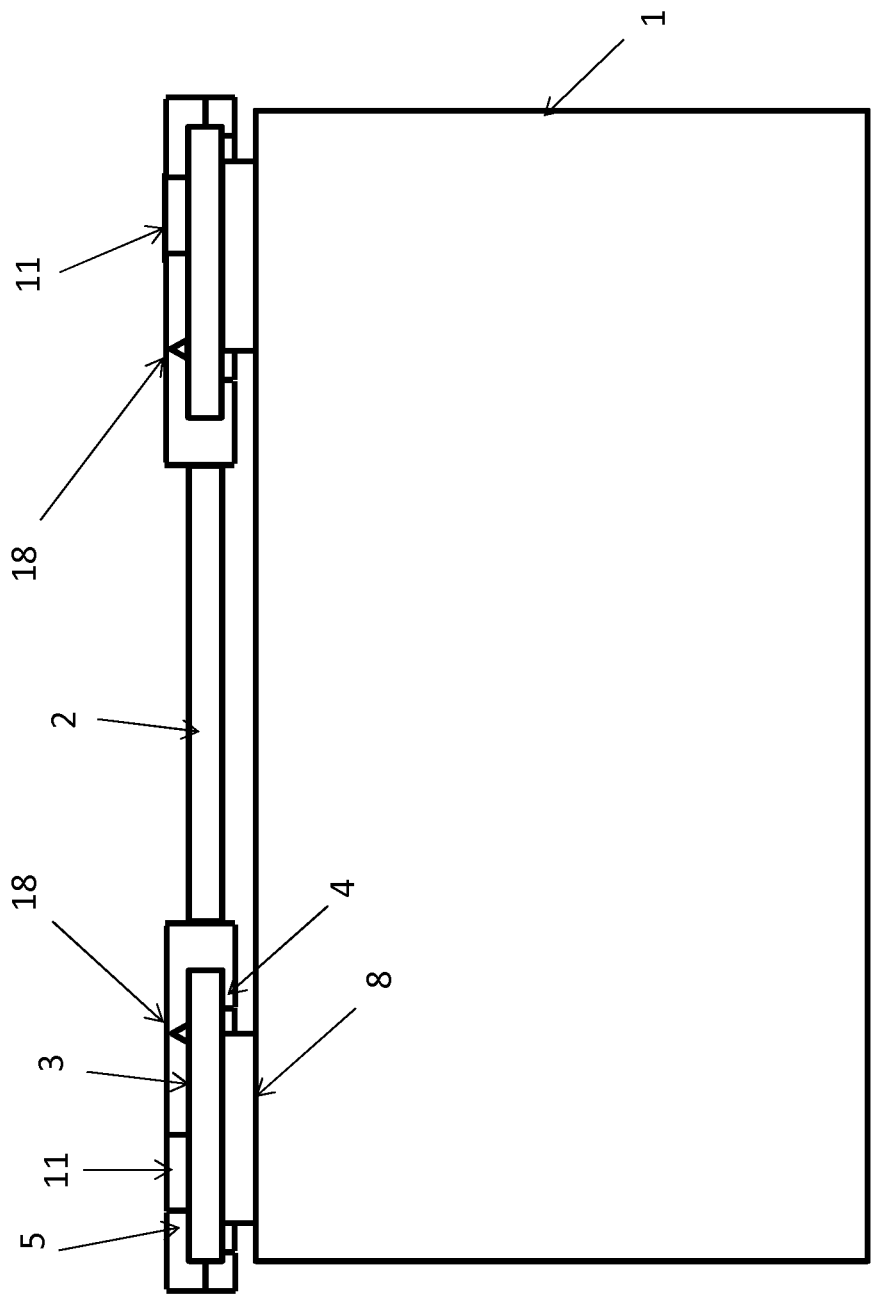
FIG. 3 illustrates a front schematic illustration of a battery system in accordance with embodiments.
Figure 4:
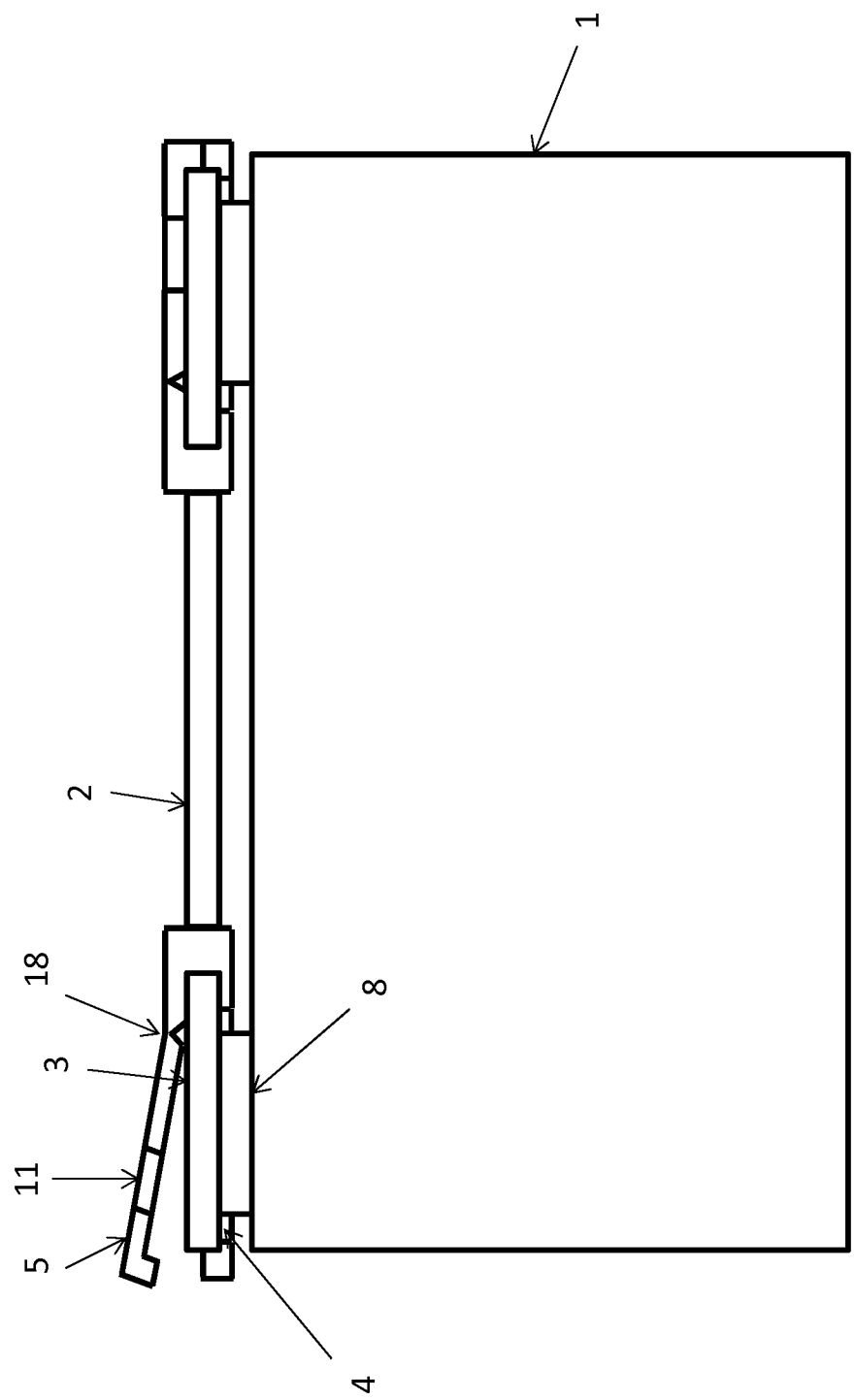
FIG. 4 illustrates a front schematic illustration of a battery system in accordance with embodiments.

As is illustrated in FIGS. 3 and 4, the second holding surfaces 5 in particular may be equipped with a hinge 18 so that they may be folded up and render it possible to insert the cell connectors 3 in a particularly simple manner. A latching mechanism may be used for closing the second holding surfaces 5.

As illustrated in FIG. 5, a voltage tapping unit 14 may be arranged on and/or over the covering plate 2. The voltage tapping unit 14 may have an electrical connection to the poles 8 of the battery cells 1 by way of measuring lines 15, the ends of which measuring lines form the contact surfaces 16. The ends may be allocated to the cells. For this purpose, the contact surfaces 16 may in each case be clamped between a first holding surface 4 and a cell connector 3. The measuring lines 15 may be fastened in addition by way of holding elements 17 to the covering plate 2.

In order to produce a battery system in accordance with embodiments, measuring lines 15 of a voltage tapping unit 14 may be arranged on and/or over the covering plate 2, by way of example, by way of holding elements 17 and/or by way of inserting contact surfaces 16 in the receiving regions for cell connectors 3. The cell connectors 3 are subsequently inserted between the first and second holding surfaces 4, 5 of the covering plate 2. The covering plate 2 is then placed on and/or over the battery cells 1 and subsequently the cell connectors 3 are connected by way of assembly openings 11 to the poles 8 of the battery cells 1.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Battery Cell
2 Covering Plate
3 Cell Connector
4 First Holding Surface
5 Second Holding Surface
6 First Extension
7 Second Extension
8 Pole
9 First Row
10 Second Row
11 Assembly Opening
12 End Side
13 Insertion Opening
14 Voltage Tapping Unit
15 Measuring Line
16 Contact Surface
17 Holding Element
18 Hinge

What is claimed is:

1. A battery system comprising:
a plurality of battery cells, each of the plurality of battery cells having a plurality of poles;
　a covering plate arranged over the battery cells and which includes a plurality of receiving regions, each of the receiving regions extending across the plurality of battery cells and having a first holding surface at a face of the covering plate that is adjacent to the battery cells and a second holding surface at a face of the covering plate that is remote from the battery cells;
　a plurality of cell connectors respectively extending through the receiving regions and which are in electrical communication with the battery cells, each of the cell connectors being in direct contact with one of the poles of each of the plurality of battery cells; and an insertion opening provided on an end side of the covering plate and configured to receive at least one of the cell connectors, the cell connectors respectively being held between the first holding surface and the second holding surface by the first holding surface and the second holding surface, the cell connectors directly contacting the first holding surface and the second holding surface, and the second holding surface comprising a plurality of openings that expose the cell connectors, the plurality of openings being arranged at a first side of the cell connectors and the plurality of battery cells being arranged at a second side of the cell connectors opposite to the first side.

2. The battery system of claim 1, wherein the first holding surface has a first extension and a second extension that lies opposite the first extension such that the cell connectors on the first holding surface are connected to the battery cells on edges of the cell connectors by the first and second extensions.

3. The battery system of claim 2, wherein the cell connectors are in electrical communication to the poles of the battery cells at the center of the cell connectors.

4. The battery system of claim 3, wherein the first extensions are shorter than the second extensions.

5. The battery system of claim 4, wherein the first and second extensions are arranged in a first row of a group of the receiving regions in such a manner that is symmetric to the first and second extensions in a second row of another group of the receiving regions that is adjacent to the first row.

6. The battery system of claim 1, wherein the receiving regions are arranged next to one another in at least two rows.

7. The battery system of claim 6, wherein the insertion opening is arranged perpendicular to one of the rows of the receiving regions.

8. The battery system of claim 6, wherein the insertion opening is arranged in a direction of one of the rows of the receiving regions.

9. The battery system of claim 1, wherein the second holding surface is movable relative to the first holding surface.

10. The battery system of claim 1, wherein the second holding surface has a hinge connection to permit movement about a hinge axis relative to the first holding surface.

11. The battery system of claim 1, further comprising a plurality of non-conductive separating elements arranged between adjacent ones of the receiving regions.

12. The battery system of claim 1, further comprising a voltage tapping unit having measuring lines.

13. The battery system of claim 12, wherein the measuring lines are in electrical communication with the cell connectors in a detachable manner.

14. The battery system of claim 12, further comprising a clamping connection configured to establish a detachable electrical communication between the measuring lines and the cell connectors.

15. The battery system of claim 14, wherein ends of the measuring lines comprise contact surfaces that are clamped between the cell connectors and one of the first holding surface and the second holding surface.

16. The battery system of claim 14, wherein the measuring lines are detachably fixed to the covering plate.

* * * * *